Patented Apr. 27, 1954

2,676,981

UNITED STATES PATENT OFFICE 2,676,981

PROCESS OF PREPARING 1,3,3,3-TETRACHLOROPROPYL ACETATE

Tracy M. Patrick, Jr., Dayton, Ohio, assignor to Monsanto Chemical Company, St. Louis, Mo., a corporation of Delaware No Drawing. Application September 25, 1950, Serial No. 186,676

4 Claims. (Cl. 260—491)

1

The present invention relates to the preparation of halogenated organic esters and deals more particularly with an improved process for the production of certain tetrachlorinated esters by reaction of vinyl acetate with carbon tetrachloride.

In the Harmon patent, U. S. No. 2,396,261, there is described the reaction of carbon tetrachloride with vinyl acetate to give products having the general formula

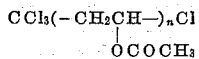

in which $n$ is an integer of from 1 to 8. When $n$ is one, the product is a simple addition product, i. e., 1,3,3,3-tetrachloropropyl acetate. Although this compound is highly valuable as a chemical intermediate in the production of the tetrachlorinated acids, aldehydes and alcohols, its actual utilization on an industrial scale has been hindered by the fact that when carbon tetrachloride is reacted with vinyl acetate, employing conditions generally described in the Harmon patent referred to above, the product is a mixture of compounds having the general formula

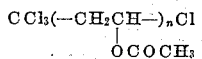

in which mixture only a small portion of the product is the 1:1 adduct. Since compounds having a higher value for $n$ are of relatively little economic importance, the commercial production of 1,3,3,3-tetrachloropropyl acetate could be achieved only at the expense of simultaneous accumulation of large stockpiles of addition products or "telomers" in which $n$ is greater than 2.

Now I have found that formation of the undesired higher ratio products may be diminished or almost entirely suppressed and conversion to the 1:1 carbon tetrachloride-vinyl acetate addition product favored if the reaction between carbon tetrachloride and vinyl acetate is conducted by employing the conditions which will be hereinafter described.

In the prior art process reaction was effected by placing vinyl acetate and carbon tetrachloride in a reaction vessel, increasing the temperature of the resulting mixture to the refluxing temperature, adding benzoyl peroxide to the heated mixture, and then continuing the refluxing for a

2 time of several hours, or until subsequent addition of benzoyl peroxide to the refluxing mixture caused no subsequent rise in temperature. The carbon tetrachloride was preferably employed in large excess, e. g. about 2.5 moles of carbon tetrachloride per mole of vinyl acetate was used. Under these conditions I have found that only about 20% of the vinyl acetate is converted to the 1:1 addition product, about 38% to the 1:2 carbon tetrachloride-vinyl acetate addition product and about 19% to the higher vinyl acetate ratio products.

While neither reaction time nor reaction temperature is critical in effecting a more favorable distribution of the type of addition products, I have discovered that the manner in which the reactants are initially contacted with each other has a surprising influence on directing the course of the reaction. The present invention is based upon the discovery that very gradual contact of one reactant with the other, and preferably a gradual contact effected under reacting temperatures, favors increased formation of the 1,3,3,3-tetrachloropropyl acetate, gives a good yield of the 1:2 carbon tetrachloride-vinyl acetate addition product and suppresses the formation of the higher ratio adducts. To obtain good yields of the 1:1 and the 1:2 addition products, i. e., the well-characterized 1,3,3,3-tetrachloropropyl acetate and the 3-acetoxy-1,5,5,5-tertachloroamyl acetate, I separately drop the vinyl acetate and the free-radical-liberating catalyst into the heated carbon tetrachloride. Unexpectedly, the gradual contact of vinyl acetate with the carbon tetrachloride, which is thus effected, causes chain termination at a stage earlier than that realized in the prior one-batch mixing process. This is surprising, for chain termination in free-radical catalyzed reactions is generally associated with such variables as temperature, time, use of inert diluents, the presence of, or formation of, chainpropagating inhibitors, etc.

The invention is further illustrated, but not limited by the following example.

Example 308 g. (2.0 moles) of dry carbon tetrachloride was placed into a one-liter flask fitted with a condenser. The carbon tetrachloride was heated to refluxing, and there was then dropped through the condenser to the boiling halide (a) 172 g. (2.0 moles) of freshly distilled vinyl acetate, and (b) a solution of 3 g. of benzoyl peroxide in 154 g. (1.0 mole) of carbon tetrachloride.

The respective dropping rates were adjusted so that all of (a) and all of (b) had been added, dropwise, to the flask during a period of about 21 hours. At the end of that time the whole was refluxed for 2 hours. The reaction mixture at this point was clear and colorless and weighed 624.3 g.

Distillation of one half of this reaction mixture (ca. 312 g.) through a 10″ Vigreux column gave the following fractions.

I. 109.0 g. B. P. below 110° C., $n_D^{25}$ 1.4569, probably unreacted material.

II. 92.9 g. (39% conversion) of substantially pure 1,3,3,3-tetrachloropropyl acetate, B. P. 56–61° C./1.5 mm., $n_D^{28}$ 1.4700, $$d_{25}^{25}\ 1.4393$$

III. 71.8 g. (44% conversion) of crude 3-acetoxy-1,5,5,5-tetrachloroamyl acetate, B. P. 96–150° C./2–3 mm., $n_D^{25}$ 1.4759.

IV. Residue, 14.3 g. (6% conversion on a 1:1 basis), amber, viscous liquid, probably

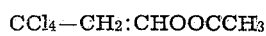

addition products in ratio higher than 1:2.

Instead of employing benzoyl peroxide as the catalyst, I may use other free-radical-liberating agents to catalyze the present process. Free-radical-liberating agents which may be employed in promoting addition of carbon tetrachloride to vinyl acetate are compounds which will decompose to give free radicals. Such compounds include peroxygen-type catalysts, for example acyl peroxides such as acetyl, benzoyl, lauroyl or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyl lead, etc. For convenience, the peroxygen type catalysts will be hereinafter referred to as peroxidic compounds. Only catalytic quantities of the free-radical-liberating agent need be employed in promoting the addition reaction. Quantities of as little as 0.001 per cent to 1.0 per cent, based on the weight of the vinyl ester, are generally sufficient to give optimum yields. In order to avoid detrimental side reactions, quantities of more than 5 per cent of the catalyst, based on the weight of the ester should not be employed. Ultra-violet light may be employed with the catalyst or as the sole catalytic agent.

Other varying conditions may be employed in the process, the present invention being based solely on the discovery that greatly improved yields of 1,3,3,3-tetrachloropropyl acetate, at the expense of products in which more than 2 moles of the ester have added to one mole of carbon tetrachloride, may be obtained by gradually feeding vinyl acetate to carbon tetrachloride in the presence of a free-radical-liberating agent as catalyst. Preferably the catalyst is separately added to the carbon tetrachloride, addition of the catalyst likewise being gradual and extending substantially over the period of time during which the vinyl acetate is being added to the carbon tetrachloride. However, the gradual addition of the catalyst to the carbon tetrachloride does not form an essential feature of the present process. The catalyst may be added initially to the carbon tetrachloride, and the vinyl acetate fed into the resulting mixture or solution. However, when employing refluxing temperatures, and/or long periods of time in the introduction of the vinyl acetate, many of the free-radical-liberating catalysts, and particularly the peroxidic agents such as benzoyl peroxide, will tend to decompose. The consequent decrease in catalyst concentration may thus necessitate periodic introduction of additional quantities of the catalyst to the reaction mixture.

While the above example shows heating of the whole reaction mixture after all of the vinyl acetate has been added to the carbon tetrachloride, this final heating step need not be employed. When the only desired product is the 1:1 adduct, the present invention provides a method for the continuous production of the 1,3,3,3-tetrachloropropyl acetate, the tetra-chloro ester being constantly removed from the reaction zone while introducing the vinyl actate, together with, when deemed expedient, additional quantities of catalyst and carbon tetrachloride.

The present addition reaction also need not be effected at refluxing temperatures. Optimum yields are generally obtained by operating at temperatures which permit steady decomposition of the catalyst, with consequent steady liberation of trichloromethyl free radicals.

As herein disclosed, the present process eliminates the necessity of employing a large excess of carbon tetrachloride. Since molar quantities of the reactants are involved in the formation of the 1:1 products, it is advantageous to employ substantially the stoichiometric proportions required for the 1:1 addition. Any excess of carbon tetrachloride which may be used is readily recovered. An excess of vinyl acetate with respect to the carbon tetrachloride is not recommended, such an excess generally leading to the preferential formation of not only addition products in which more than 2 moles of vinyl acetate have combined with one mole of carbon tetrachloride, but also to vinyl acetate polymers.

The time during which the vinyl acetate is introduced to the carbon tetrachloride may be widely varied, depending upon the reactant quantities, the reaction temperatures used, the nature of the individual catalyst employed, etc. When employing mechanical feeding devices flow of the vinyl acetate into the reaction zone may be at an hourly rate of, say, from 0.01 liter to 1.0 liter of vinyl acetate per mole of carbon tetrachloride present in the reaction zone. The vinyl acetate may be fed into the carbon tetrachloride in a thin stream or it may be added dropwise.

An extraneous inert solvent or diluent, e. g. benzene or cyclohexane, may be employed, either to serve as catalyst solvent, to mitigate reaction heat, or to dilute the conentration of the vinyl acetate in the reaction mixture. However, when operating under conditions herein described, such a solvent or diluent generally is of little economic advantage.

What I claim is:

1. The process of preparing 1,3,3,3-tetrachloropropyl acetate which comprises adding vinyl acetate to carbon tetrachloride at an hourly rate of from 0.01 liter to 1.0 liter of vinyl acetate per liter of carbon tetrachloride and in the presence of a free-radical-liberating agent.

2. The process of preparing 1,3,3,3-tetrachloropropyl acetate which comprises adding vinyl acetate to heated carbon tetrachloride at an hourly rate of from 0.01 liter to 1.0 liter of vinyl acetate per liter of carbon tetrachloride and in the presence of a free-radical-liberating agent.

3. The process of preparing 1,3,3,3-tetrachloropropyl acetate which comprises adding vinyl acetate to heated carbon tetrachloride at an hourly rate of from 0.01 liter to 1.0 liter of vinyl acetate per liter of carbon tetrachloride while separately and gradually adding a free-radical-liberating agent to said carbon tetrachloride.

4. The process of preparing 1,3,3,3-tetrachloropropyl acetate which comprises adding vinyl acetate to heated carbon tetrachloride at an hourly rate of from 0.01 liter to 1.0 liter of vinyl acetate per liter of carbon tetrachloride while separately and gradually adding to said carbon tetrachloride a solution of benzoyl peroxide in carbon tetrachloride.

References Cited in the file of this patent

UNITED STATES PATENTS

| Number | Name | Date |
|---|---|---|
| 2,396,261 | Harmon | Mar. 12, 1946 |